US006839690B1

(12) United States Patent
Foth et al.

(10) Patent No.: US 6,839,690 B1
(45) Date of Patent: Jan. 4, 2005

(54) SYSTEM FOR CONDUCTING BUSINESS OVER THE INTERNET

(75) Inventors: Thomas J. Foth, Trumbull, CT (US); Michael S. Ryan, Darien, CT (US); Robert Bedard, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/547,293

(22) Filed: Apr. 11, 2000

(51) Int. Cl.[7] .......................... G06F 17/60; H04K 1/00; H04K 9/00

(52) U.S. Cl. ............................ 705/53; 705/37; 705/26

(58) Field of Search ............................. 705/53, 37, 26

(56) References Cited

U.S. PATENT DOCUMENTS

| 5,819,092 | A | | 10/1998 | Ferguson et al. | ........... 395/701 |
|---|---|---|---|---|---|
| 5,950,172 | A | * | 9/1999 | Klingman | ................... 705/26 |
| 6,058,379 | A | * | 5/2000 | Odom et al. | ................... 705/37 |
| 6,141,653 | A | | 10/2000 | Conklin et al. | ............... 705/80 |
| 6,236,977 | B1 | * | 5/2001 | Verba et al. | .................. 705/10 |
| 6,415,270 | B1 | * | 7/2002 | Rackson et al. | .............. 705/36 |
| 2002/0072978 | A | * | 3/2000 | Odom et al. | .................. 705/26 |
| 2001/0032165 | A | * | 12/2000 | Friend et al. | .................. 705/37 |
| 2001/0032878 | A1 | * | 2/2001 | Tsiounis et al. | ............. 235/379 |
| 2002/0032638 | A1 | * | 3/2001 | Arora et al. | ................... 705/37 |
| 2002/0038277 | A1 | * | 7/2001 | Yuan | ........................... 705/37 |
| 2002/0067261 | A1 | * | 7/2001 | Kucharczyk et al. | .... 340/568.1 |
| 2001/0034631 | A1 | * | 10/2001 | Kiselik | ........................... 705/8 |
| 2002/0046137 | A1 | * | 12/2001 | Odom et al. | ................... 705/26 |

FOREIGN PATENT DOCUMENTS

| WO | WO 0211044 A2 | * | 2/2001 | ........... G06F/17/60 |
|---|---|---|---|---|
| WO | WO 0109787 A2 | * | 8/2001 | ........... G06F/17/60 |

OTHER PUBLICATIONS

Yan, Ellen, Refining credit–review policy for small business, Summer 2000, Commercial Lending Review, v15, n 3, pp. 39–43.*

Miller, Terry, Buyers, don't get stock in the quicksand of the FAR jungle, Jul. 1997, Government COmputer News, v16, n18, p. 45(1).*

* cited by examiner

*Primary Examiner*—James P. Trammell
*Assistant Examiner*—Firmin Backer
(74) *Attorney, Agent, or Firm*—Ronald Reichman; Angelo N. Chaclas

(57) ABSTRACT

An Internet-based system that allows a buyer and a seller to obtain information about each other while remaining somewhat anonymous. The system provides historic information to buyer and seller by having a trusted third party give the buyer and seller the other party's trading history information without revealing the actual identity of the parties. A buyer registers with the trusted third party by submitting an online application. The trusted third party establishes a credit score for the buyer. A seller registers with the trusted third party by submitting an online application. The trusted third party establishes a score for the seller based upon the seller's trading history, reputation and financial standing. When the buyer chooses to purchase a product from a seller over the Internet, certain parameters i.e., dollar value of transaction, type of purchase, level of current outstanding credit available, credit score, etc. are substituted into an algorithm to determine the maximum purchase amount that may be financed at what terms and how much money the buyer will have to place in escrow. The buyers escrow may be furnished to the trusted third party by credit cards, ACH, wire transfer, etc. If the trusted third party is not satisfied with the seller's score, the trusted third party may require the seller to post a bond for some or all of the seller's transactions.

17 Claims, 3 Drawing Sheets

SYSTEM FOR CONDUCTING BUSINESS OVER THE INTERNET

FIELD OF THE INVENTION

This invention pertains to commercial transactions and more particularly to transactions over the internet.

BACKGROUND OF THE INVENTION

In the past buyers and sellers of goods typically met each other to discuss the terms for purchasing the goods. The buyers and the sellers had an opportunity to observe each other and the quality of the goods desired to be purchased. The buyer may have purchased the goods on the spot for the agreed upon price, or the seller may have made similar goods for the buyer which would be delivered and sold at a later date. If the buyer did not have enough money to purchase the goods, the seller may have given the buyer credit to purchase the goods or require the buyer to have some third party known to the buyer and the seller to issue credit to the buyer. If the buyer thought the seller unable to deliver the goods at the agreed upon time or if the buyer thought the goods may not have met the agreed upon quality standards, the buyer may require the seller to post a bond issued by some third party that is known to the buyer and the seller. The above type of transactions are referred to as "arms length transactions".

In today's society with the proliferation of personal computers in the home, office and factory and the ability to easily connect to the Internet, electronic shopping has replaced many arms length transactions. In the most common scenario, a buyer wishing to purchase goods from a seller visits the seller's web site. The web site allows the buyer to select the desired goods to ascertain its price and to purchase the goods, if so desired. The buyer may not know much about the seller of the goods, i.e., the seller's reputation for selling or manufacturing quality goods, delivering the goods on time and standing by the sold goods, etc. Likewise, the buyer may not know much about the buyer of the goods, i.e., the buyer's ability to pay for the purchased goods, does the buyer typically pay for the goods in a timely manner, does the buyer typically complain about or return goods that meet the specification, etc. Once the buyer clicks on an icon designating an intent to buy the goods, the buyer is immediately confronted with a screen that needs to be filled in with the personal profile and/or business profile of the buyer so that the seller may be able to determine whether or not he should make a deal with the buyer. The buyer may not want to provide personal information or confidential competitive business information to the seller. The buyer would like to know whether or not the seller is able to produce and/or deliver goods that meet the specification in a timely manner.

In the present environment, it would be unlikely that buyers will be able to post anonymous Request For Quote (RFQ) or Request For Proposal (RFP) on the internet and receive responses from qualified sellers.

SUMMARY OF THE INVENTION

This invention overcomes the disadvantages of the prior art by providing a internet based system that allows a buyer and a seller to obtain information about each other while remaining somewhat anonymous. The system provides historic information to buyers and sellers by having a trusted third party give the buyer and seller the other party's past trading history information Without revealing the actual identity of the parties. The system would also add information from trades in Which the system participated.

A buyer registers with the trusted third party by submitting an online application. The trusted third party establishes a credit score for the buyer. A seller registers with the trusted third party by submitting an online application. The trusted third party establishes a score for the seller based upon the seller's trading history, reputation and financial standing. When the buyer chooses to purchase a product from a seller over the internet, certain parameters, i.e., dollar value of transaction, type of purchase, level of current outstanding credit available, credit score, etc. are substituted into an algorithm to determine the maximum purchase amount that may be financed and at what terms and how much money the buyer will have to place in escrow. The buyer's escrow may be furnished to the trusted third party by credit cards, automated clearing house (hereinafter "ACH"), wire transfer, etc. If either the trusted third party or the buyer is not satisfied with the seller's score, the trusted third party may require the seller to post a bond for some or all of the seller's transactions. This system also permits the buyer and seller to disclose their identity at any time they desire during the process.

Agreement templates are provided to the buyers and the sellers to help them to collaboratively enter into a contract. Just before the contract is entered and agreed to, the identity of the buyer and seller is revealed. This system also tracks the goods: shipment, delivery, acceptance, warranty problems, and payment.

DETAILED DESCRIPTION OF THE PREFERRED EMBODIMENT

Figure 1:
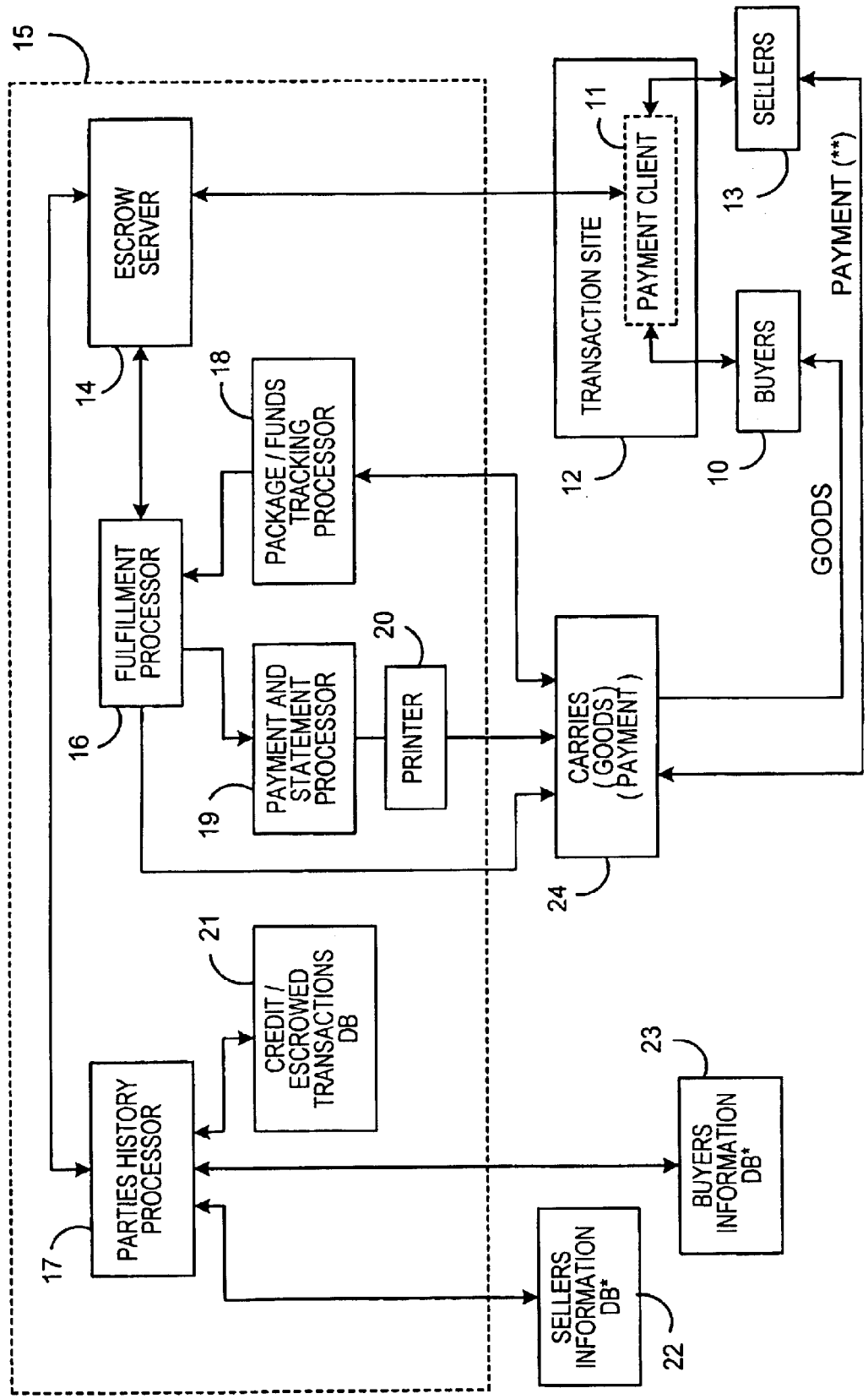
FIG. 1 is a drawing of an online system for conducting commercial transactions.

Referring now to the drawings in detail, and more particularly to FIG. 1, the reference character 10 represents a plurality of buyers who communicate online with a payment client 11 contained within a transaction site 12. A plurality of sellers 13 communicate online with a payment client 11 contained within transaction site 12. Payment client 11 is coupled to payment server 14, which is contained within trusted third party data center 15. Center 15 includes: a server 14 that is coupled to fulfillment processor 16 and to the party's history processor 17, a package/funds tracking processor 18 that is coupled to processor 16, a payment and statement processor 19 that is coupled to processor 16 and printer 20, and a credit/escrowed transactions data base 21 that is coupled to processor 17. Data base 21 contains buyer's and seller's trading histories and escrowed and bonded transactions.

A seller's information data base 22 is coupled to processor 17. Data base 22 contains information concerning the seller's reputation and financial standing. A buyer's information data base 23 is coupled to processor 17. Data base 23 contains information concerning the buyers reputation and financial standing. It would be obvious to one skilled in the art that the "processors" described herein are logical and not physical processors and may reside in one system.

When a buyer 10 chooses to purchase a product from a seller 13 over the internet, processor 17 will determine the buyer's credit score. The credit score is dependent upon: the dollar value of the transaction, the type of purchase, the level of current outstanding credit available, the terms extended to the buyer 10 from the seller 13 (10 days, 30 days, etc.) and the amount of cash deposited by the buyer 10 with the trusted third party as escrow. The escrow portion may be funded by credit cards, ACH, wire transfer, etc. The algorithms that will determine the distribution of buyer escrow funds and buyer credit are as follows: Where: Escrow and Amount=D-CR [C(B), H(B), T, D] C=the credit score, H=the credit and/or payment history, T=purchase and transaction information, D=Transaction dollar value, CR is a function to score credit availability, B=buyer's information.

Common available credit scoring algorithms to determine the maximum safe credit will be used. An example of a credit scoring algorithm is the credit desk produced by Fair Isaac and Company of 120 North Redwood Drive, San Rafael, Calif.

An example of an escrow calculation is as follows: Buyer ABC Corp wishes to buy a forklift for $30,000.00.

Credit and Amount=CR [C(ABC Corp), H(ABC CORP), "forklift", 30000]

Escrow and Amount=30000—Credit and Amount

Escrow %=(Escrow $ Amount) (Transaction $ Value)

Credit $ Amount=Transaction $ Value—Escrow $ Amount

Processor 17 establishes the seller's 13 score based upon the seller's trading history, reputation and financial standing. The seller's escrow is arrived at by combining seller's credit rating along with seller's previous transaction scores. Seller is scored on buyer's comments of quality along with promptness of delivery, accuracy of description after sales, service, etc.

After processor 17 establishes from the information contained in data bases 22 and 23 the amount of funds and amount of escrow that will have to be deposited by buyer 10 and seller 13 with the trusted third party, processor 17 will transmit the calculated amounts to data base 21 and to escrow server 14. Server 14 will transmit the calculated amounts to escrow client 11 so that buyer 10 and seller 13 may utilizes the foregoing calculated amounts in negotiating a contract for the sale of specified goods and merchandise. The terms and conditions for the sale of the specified goods and merchandise are contained in a template residing in escrow client 11. Note that the seller can waive all or part of the escrow requirement but incurs the risk.

After a contract is entered into by buyer 10 and seller 13, escrow client 11 transmits the contract to server 14. Then server 14 transmits the contract to processor 16. Processor 16 uses sources for funds are: credit card clearing house, ACH, and manual systems, to receive checks. In the case of the buyer using a credit card to cover the escrow, fulfillment processor 16 authorizes and places a charge against the buyer's credit card. The results of this transaction is tracked by processor 18. In addition, credit card transactions are passed through escrow server 14 to history processor 17 to be recorded in buyer's database 23. In this way, the results of credit card transactions are used to escrow future transactions.

In the case of ACH debit transactions, fulfillment processor 16 causes a debit to be placed against the buyer's ACH account. As with the credit card transaction above, the payment is tracked by processor 18 and recorded in database 23 by way of server 14 and processor 17.

For all other transactions (wire transfers, ACH, credit and check), the funds tracking processor 18 is instructed to wait on the arrival of funds via the appropriate source in a specified period of time. When the funds arrive, or if the specified time period lapses, processor 18 notifies processor 16 (as well as recording the information in database 23 by way of server 14 and processor 17). Fulfillment processor 16 holds the funds collected in escrow as well as notifies the credit/escrow processor 21 of any credit indebtedness incurred by the buyer in this transaction.

Processor 19 is responsible for printing a record of all transactions on printer 20. It is also responsible for printing statements to buyers consisting of a record of all their purchases, escrow payments and outstanding credit payments. For sellers, processor 19 prints a record of sales and funds receipts. Note this may be a virtual printer, and these statements may be presented over the Internet using a product such as the Digital Document Delivery System manufactured by Pitney Bowes Inc. of One Elmcroft Road, Stamford, Conn.

Carrier 24 is coupled to processor 18.

Carrier 24 also receives the bargained for goods or merchandise from seller 13 and delivers the bargained for goods or merchandise to buyer 10. Processor 18 monitors carrier 24 to determine when goods have arrived at the buyer's location. This triggers a timer in fulfillment processor 16. If the buyer accepts or-does not notify the system by way of client 11, server 14 and processor 16 before the agreed upon time period, the transaction is closed, and funds flow from processor 16 to seller 13's ACH deposit account. If the buyer rejects the goods, the buyer is instructed to return the goods to seller 13 by way of carrier 24 in a specified period. Processor 18 monitors carrier 24 to determine if the buyer 10 has complied within the required time. If buyer 10 does not comply, the transaction is closed, and fulfillment processor 19 transfers the funds to seller 13.

Figure 2A:
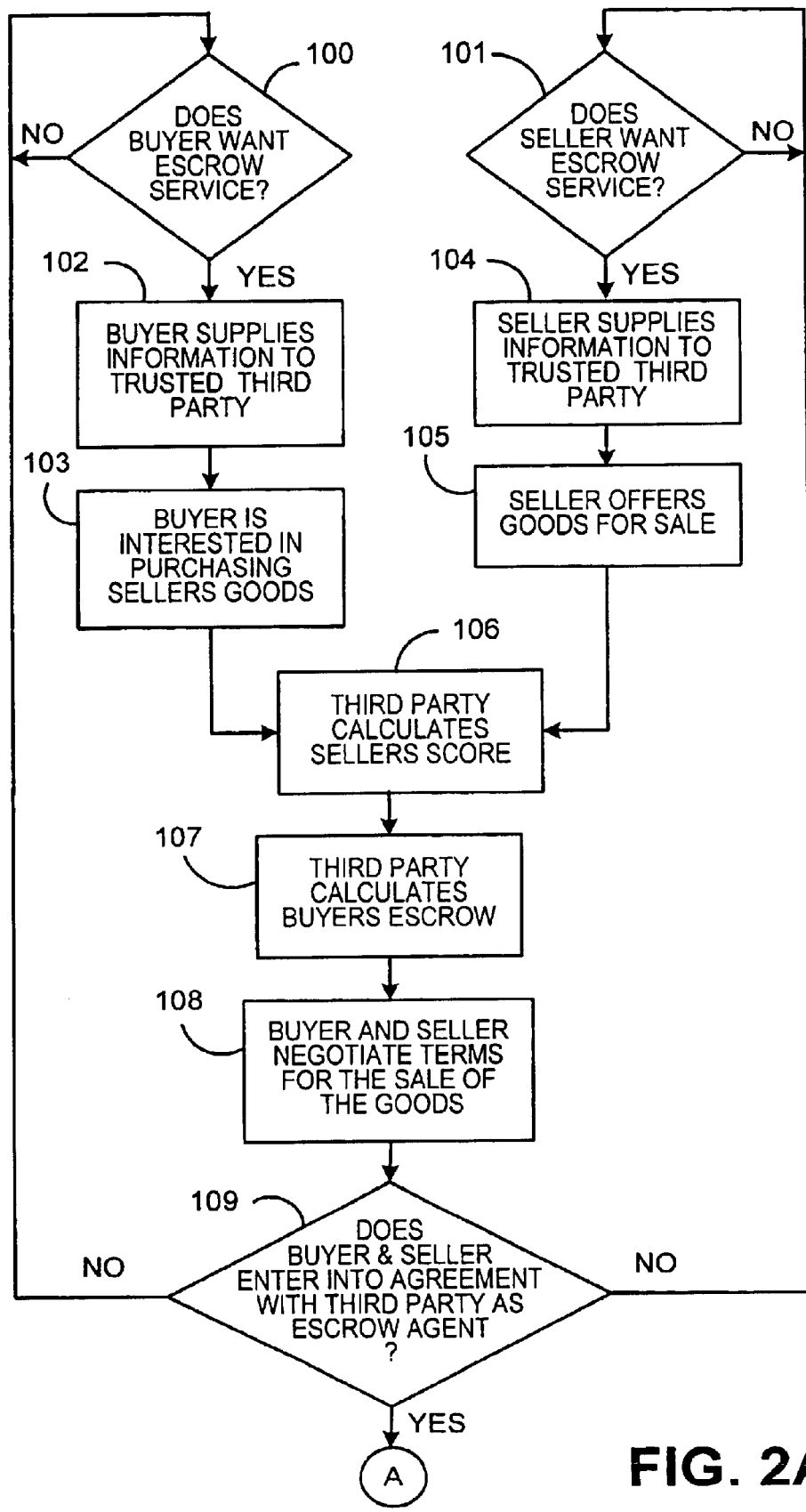
FIGS. 2A and 2B is a flow chart showing a online commercial transaction.
Figure 2B:
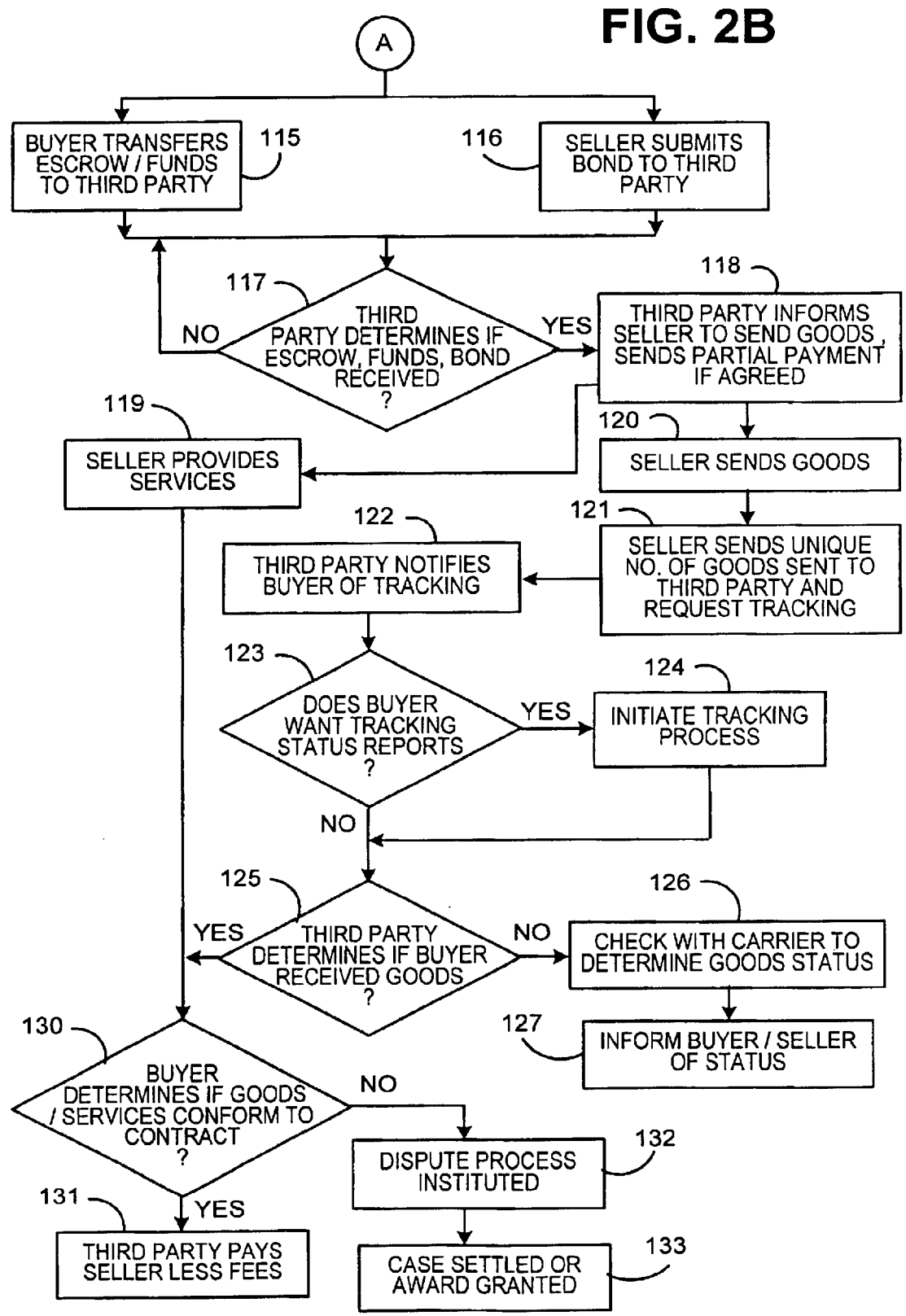

FIGS. 2A and 2B is a flow chart showing an online commercial transaction. The program begins in decision blocks 100 or 101. Block 100 determines whether or not a buyer wants to subscribe to the escrow/bonding service supplied by the trusted third party. If block 100 determines that a buyer does not want to subscribe to the escrow/bonding service supplied by the trusted third party, the program terminates and informs the buyer that the transaction may mot take place. If block 100 determines that a buyer wants to subscribe to the escrow/bonding service supplied by the trusted third party, the program goes to the input of block 102. Block 102 requires the buyer to submit information about the buyer to the trusted third party. The buyer also gives the trusted third party authorization to obtain information about the buyer from other data bases and other parties. If block 101 determines that a seller does not want to subscribe to the escrow/bonding service supplied by the trusted third party, the program terminates and informs the seller that the transaction is not possible. If block 100 determines that a seller wants to subscribe to the escrow/bonding service supplied by the trusted third party, the program goes to the input of block 104. Block 104 requires the seller to submit information about the seller to the trusted third party. The seller also gives the trusted third party authorization to obtain information about the seller from other data bases and other parties.

Then the program goes to block 105 where the seller offers goods and/or merchandise or services for sale. At this point, the buyer may elect to go to block 105, where the may buyer express an interest in purchasing the goods and/or merchandise or services offered by the seller. The buyer may also express an interest in receiving a quote for certain specified goods and/or merchandise or services in block 103.

If the seller is interested in giving the buyer a quote for the goods and/or merchandise specified by the buyer, or the buyer is interested in purchasing the goods and/or merchandise or services offered for sale by the seller and the buyer and the seller are interested in entering into a transaction, the program goes to block 106. In block 106, the trusted third party calculates the seller's score and bond amount. Then the program goes to block 107 where the trusted third party calculates the buyer's credit score and escrow amount. Then the program goes to block 108 where the buyer and seller negotiate terms and conditions for the sale of the specified goods and/or merchandise. Now the program goes to decision block 109. Block 109 determines whether or not the buyer and seller want to enter into a contract for the sale of the specified goods and/or merchandise or services with the trusted third party as escrow agent. If block 109 determines that the buyer and seller do not want to enter into a contract for the sale of the specified goods and/or merchandise, or services with the trusted third party as escrow agent, the program goes back to the inputs of blocks 100 and 101. If block 109 determines that the buyer and seller want to enter into a contract for the sale of the specified goods and/or merchandise or services with the trusted third party as escrow agent, the program goes to the inputs of blocks 115 and 116 (FIG. 2B).

In block 115 the buyer transfers any agreed upon escrow and/or down payment to the trusted third party. In block 116, the seller transfers any agreed upon escrow and/or bond to the trusted third party.

Then the program will go to the input of decision block 117. Decision block 117 determines whether or not the trusted third party received the agreed upon escrow, bond and/or deposit. If block 117 determines that the trusted third party did not receive the agreed upon escrow, bond and/or deposit, the program goes back to the input of block 117. If block 117 determines that the trusted third party received the agreed upon escrow, bond and/or deposit, the program goes to the input of block 118.

In block 118, the trusted third party informs the seller to send the goods and or merchandise and/or to supply the services to the buyer. The timeline for the transaction may be as follows: transaction established, escrow transfer by date, ship by date, need to receive by date, receipt date, need to return by date (acceptance), return ship date, need to receive return date, return acceptance date, and release or dispute date. If agreed upon by the parties, the trusted third party sends a partial payment to the seller. In block 119 the seller supplies the specified services to the buyer. In block 120 the seller sends the goods and/or merchandise to the buyer. Then the program goes to block 121 where the seller requests tracking and sends a common carrier or post supplied unique number that is used to track the goods and/or merchandise to the trusted third party. Then the trusted third party notifies the buyer of the unique number for the tracking in block 122.

At this point, the program goes to decision block 123. Block 123 determines whether or not the buyer wants a tracking status report. If block 123 determines that the buyer does not want a tracking status report, the program goes to block 125. If block 123 determines that the buyer wants a tracking status report, the program goes to block 124 to initiate the written or online tracking process. Then the program goes to the input of decision block 125. In decision block 125 the trusted third party determines whether or not the buyer received the goods and/or merchandise in the agreed upon time. If block 125 determines that the buyer did not receive the goods and/or merchandise in the agreed upon time, the program goes back to block 126. In block 126 the trusted third party checks with the common carrier to determine the delivery status of the goods and/or merchandise. Then the program goes to block 127 where the trusted third party informs the buyer an/or seller of the delivery status of the goods and/or merchandise. If the trusted third party determines in block 125 that the buyer received the goods and/or merchandise in the agreed upon time, the program goes to the input of decision block 130. The program also goes to the input of block 130 from the output of block 119.

In block 130, the buyer determines whether or not the goods and/or merchandise or services conform to the contract. If block 130 determines that the goods and/or merchandise or services conform to the contract, the program goes to block 131. In block 131, the buyer gives the trusted third party any remaining funds and authorizes the trusted third party to pay the seller the monies due the seller and to keep any fees due the trusted third party. If block 130 determines that the goods and/or merchandise or services do not conform to the contract, the program goes to block 132 to begin the dispute process. Renegotiation or settlement is suggested at various stages in the dispute process. Then the program goes to block 133 where the trusted third party attempts to settle the dispute with the buyer and the seller, or the buyer and the seller attempt to settle the dispute by themselves, or the buyer and seller mediate the dispute, or the buyer and seller arbitrate the dispute.

The above specification describes a new and improved internet based system that allows a buyer and a seller to obtain information about each other while remaining somewhat anonymous. It is realized that the above description may indicate to those skilled in the art additional ways in which the principals of this invention may be used without departing from the spirit. It is, therefore, intended that this invention be limited only by the scope of the appended claims.

What is claimed is:

1. A method for facilitating automated electronic payment online for commercial transaction, the method comprising the steps of:
   A) registering electronically buyer information with a trusted third party;
   B) registering electronically seller information with the trusted third party;
   C) offering specified goods;
   D) negotiating terms for the sale of the specified goods;
   E) having the trusted third party calculate electronically the buyer's credit score and seller's standing score which is dependent upon the seller's trading history and the seller's financial standing for the purchase of the specified goods;
   F) contracting for a sale of the specified goods, which includes monies, amount of credit, amount of escrow and amount of bond to be deposited with the trusted third party that is dependent upon the buyer's credit and seller's standing score;
   G) transferring buyer and/or seller funds and/or escrow and/or bond to the trusted third party;
   H) delivering specified goods to buyer; and
   I) having the trusted third party pay the seller the contractually agreed upon amount if the buyer determines that the delivered goods comply with the contract.

2. The method claimed in claim 1, wherein in step C the specified goods are offered for sale by a seller.

3. The method claimed in claim 1, wherein in step C a buyer requests a quote for the specified goods.

4. The method claimed in claim 1, wherein in step C a seller offers specified merchandise or specified services for sale.

5. The method claimed in claim 1, wherein in step C a buyer requests a quote for specified merchandise or specified services.

6. The method claimed in claim 1, wherein the buyer's credit score is calculated using:

commercially available scoring services.

7. The method claimed in claim 1, wherein the seller's standing score is calculated using:

commercially available scoring services.

8. The method claimed in claim 1, further including the following steps:

having the trusted third party track the delivery of the specified goods.

9. The method claimed in claim 1, wherein in step H, if the buyer determines that the goods do not conform to the contract, a dispute process is instituted.

10. The method claimed in claim 9, wherein the buyer and the seller attempt to settle the dispute by mediation.

11. The method claimed in claim 10, wherein the buyer and the seller settle the dispute by arbitration.

12. The method claimed in claim 1, further including the step of:

charging the buyer for the efforts of the trusted third party.

13. The method claimed in claim 1, further including the step of:

charging the seller for the efforts of the trusted third party.

14. The method claimed in claim 1, wherein in step G), a time line is established for transferring.

15. The method claimed in claim 1, wherein in step H), a time line is established for delivering the goods.

16. The method claimed in claim 1, wherein in step 1), a time line is established for accepted the goods.

17. The method claimed in claim 1, after step F) including the step of:

having the trusted third party make an optional payment to the seller.

* * * * *